United States Patent
Daos et al.

(10) Patent No.: US 7,603,438 B2
(45) Date of Patent: Oct. 13, 2009

(54) SYSTEM AND METHOD FOR ASSISTED ENTRY OF DATABASE SCHEMA DATA

(75) Inventors: Brenda Daos, Mission Viejo, CA (US); Vincent Wu, Irvine, CA (US); Karthik Logasundaram, Coimbatore (IN); Harpreet Singh, Orange, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 738 days.

(21) Appl. No.: 11/249,214

(22) Filed: Oct. 13, 2005

(65) Prior Publication Data

US 2007/0088726 A1    Apr. 19, 2007

(51) Int. Cl.
- G06F 15/16   (2006.01)
- G06F 17/00   (2006.01)
- G06F 7/00    (2006.01)
- G06F 12/00   (2006.01)

(52) U.S. Cl. .................. 709/219; 707/100; 707/101; 707/104.1; 707/200

(58) Field of Classification Search .............. 707/2, 707/100–102; 715/237, 513; 709/219–228; 345/473; 358/1.15
See application file for complete search history.

(56) References Cited

U.S. PATENT DOCUMENTS

| | | | |
|---|---|---|---|
| 6,199,195 B1 * | 3/2001 | Goodwin et al. ............ | 717/104 |
| 6,535,868 B1 * | 3/2003 | Galeazzi et al. ............. | 707/2 |
| 6,781,346 B2 | 8/2004 | Reinhard et al. | |
| 6,792,462 B2 | 9/2004 | Bernhardt et al. | |
| 6,871,346 B1 * | 3/2005 | Kumbalimutt et al. ...... | 718/104 |
| 7,200,805 B2 * | 4/2007 | Carlson et al. .............. | 715/237 |
| 2003/0163707 A1 | 8/2003 | Shigeeda | |
| 2004/0111428 A1 * | 6/2004 | Rajan et al. .................. | 707/102 |
| 2004/0153968 A1 * | 8/2004 | Ching et al. ................. | 715/513 |
| 2005/0055380 A1 | 3/2005 | Thompson et al. | |
| 2005/0234934 A1 * | 10/2005 | Mackay et al. .............. | 707/100 |

* cited by examiner

Primary Examiner—Joseph E Avellino
Assistant Examiner—Banglong Tran
(74) Attorney, Agent, or Firm—Tucker Ellis & West LLP

(57) ABSTRACT

The present invention is directed to a system and method for the assisted entry of database schema entries. Schema input data is first received from an associated user and tested for acceptability. When the schema input data is unacceptable following the testing, the associated user is then prompted for corrected schema input data. The presence of software tools required to implement the schema instructions specified by the schema input data is then tested and a signal is generated when such required software is absent. A representation of the complete schema is then generated, including the schema input data, and the associated user is prompted to confirm the acceptability of the complete schema setup. The associated user then confirms the acceptability of the complete schema setup and the schema input data is then communicated, following user confirmation, to an associated database server for implementation.

12 Claims, 5 Drawing Sheets

SYSTEM AND METHOD FOR ASSISTED ENTRY OF DATABASE SCHEMA DATA

BACKGROUND OF THE INVENTION

This invention is directed to a method and system for assisted database entry. More particularly, this invention is directed to a method and system for assisted entry of database schema entries.

On typical local area networks, or wide area networks, a directory service identifies all aspects of the network including users, software, hardware, and the various rights and policies assigned to each. As a result, application are able to access information without knowing where a particular resource is physically located, and users are able to interact with the network ignorant of the network's topology and protocols. The process by which directory service administrators create directory service schema, or organization, changes, as well as adding customized attributes, is an exact process, very prone to errors. Typographical errors or mistakes in data entry not identified during the creation/addition process are not readily correctable. The customized attributes generally remain until the directory service server is reinstalled, wherein the directory service administrator must first disable any custom attributes previously created containing errors, and initiate the process for addition of each attribute created with errors from the beginning. This is a time-intensive process, requiring meticulous care by the directory service administrator.

The subject invention overcomes the aforementioned problems and provides a method and system for the assisted entry of database schema entries.

SUMMARY OF THE INVENTION

In accordance with the present invention, there is provided a system and method for assisted database entry.

Further in accordance with the present invention, there is provided a system and method for assisted entry of database schema information.

Still further, in accordance with the present invention, there is provided a system and method for performing automatic schema class and customizable attribute changes in a directory service environment.

In accordance with the present invention, there is provided a system for assisted entry of database schema entries. The system includes receiving means adapted to receive schema input data from an associated user and validation means adapted to test the schema input data to determine the acceptability of the data. The system further includes prompting means adapted to prompt the associated user for corrected schema input data upon the determination by the testing means of the unacceptability of the input schema data. The system also incorporates testing means adapted to test for the presence of software tools required to implement schema instructions specified by the schema input data, and signal generation means adapted to generate a signal upon a determination by the testing means of the absence of the requisite software tools. The system includes generation means adapted to generate a representation of a complete schema setup including the schema input data and prompting means adapted for prompting the associated user for confirmation as to the acceptability of the complete schema setup. In addition, the system includes receiving means adapted to receive confirmation data from the associated user representing the acceptability of the complete schema setup and communications means adapted to communicate the complete schema setup to an associated database server for implementation upon receipt of the confirmation data.

Further, in accordance with the present invention, there is provided a method for assisted entry of database schema entries. The method begins with the receipt of schema input data from an associated user and then testing the schema input data for acceptability. Next, the user is prompted for corrected schema input data upon the determination that the schema input data is unacceptable following testing. The method also includes testing for the presence of software tools required to implement the schema instructions specified by the schema input data and generating a signal when such required software is absent. The method further includes generating a representation of the complete schema setup, including the schema input data, and prompting the associated user to confirm the acceptability of the complete schema setup. In addition, the method includes receiving confirmation data representing the acceptability of the complete schema setup from the associated user and communicating the complete schema setup to an associated database server for implementation upon the receipt of the confirmation data.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

This invention is directed to a system and method for assisted database entry. In particular, the present invention is directed to a system and method for assisted entry of database schema information. More particularly, the present invention is directed to a system and method for performing automatic schema class and customizable attribute changes in a directory service environment. In the preferred embodiment, as described herein, the document processing device is suitably an image generating device. Preferably, the image generating device is a multifunctional peripheral device, capable of providing scanning, copying, facsimile, printing, document management, document storage, electronic mail, and other functions to a user. In the preferred embodiment, the subject invention includes reference to a directory service program that enables applications to find, use, and manage directory resources, such as usernames, network peripherals, permissions, and the like, in a distributed computing environment. More preferably, the directory service program is suitably capable of integrating domain name server/services as well as capable of interoperability with lightweight directory access protocols. Those skilled in the art will appreciate that the subject invention is equally applicable to any directory service program known in the art, including, without limitation, Active Directory™ directory service program by Microsoft Corporation, and the like.

Figure 1:
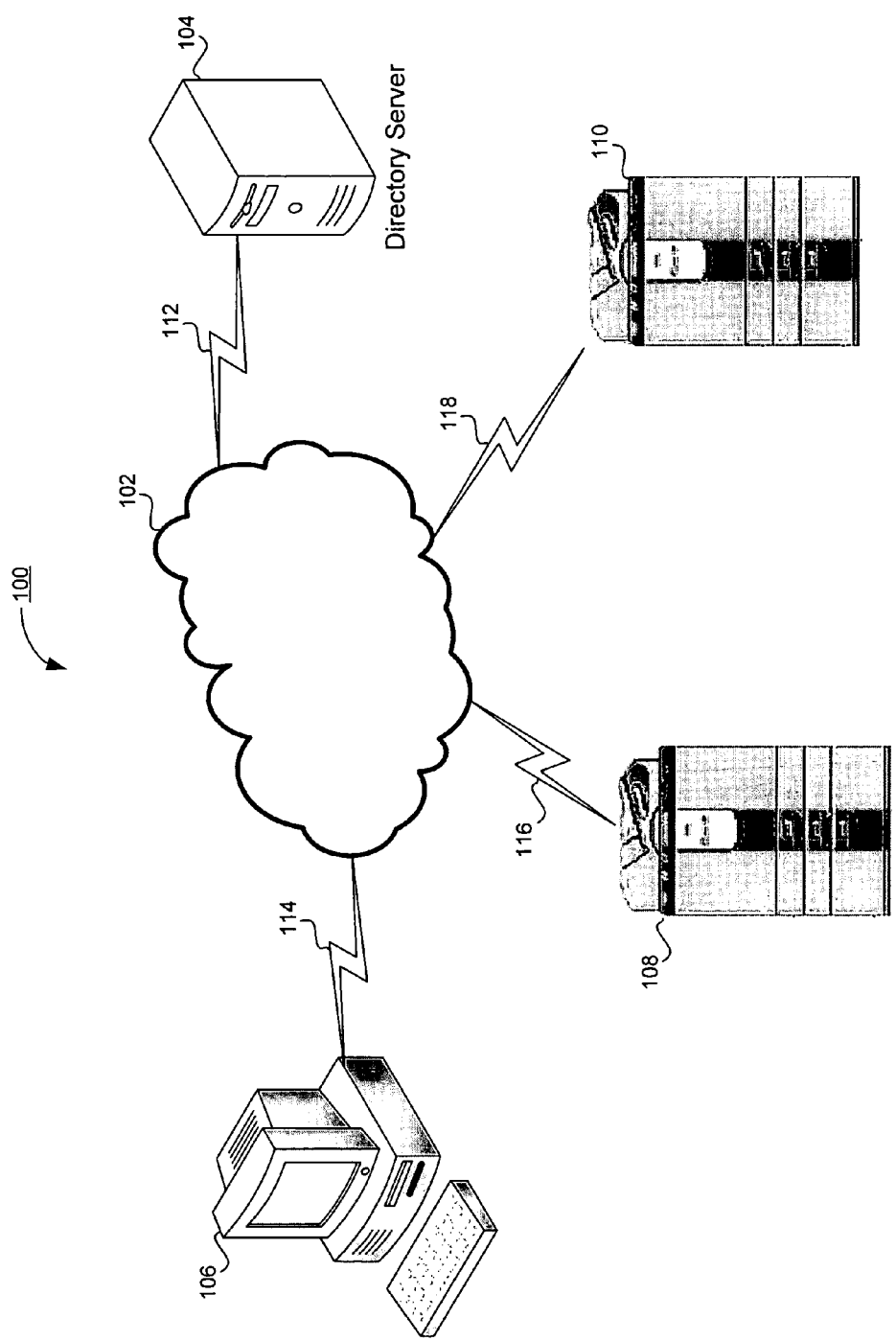
FIG. 1 is a block diagram illustrative of the system of the present invention.

Turning now to FIG. 1, there is shown a block diagram illustrating a system 100 in accordance with the present invention. As depicted by FIG. 1, the system 100 includes a distributed computing environment, computer network 102. It will be understood by those skilled in the art the computer network 102 is any computer network known in the art capable of enabling communications between two or more electronic devices. As the skilled artisan will appreciate, the present invention is capable of being implemented on any such computer network, including for example and without limitation, a local area network, a wide area network, a personal area network, Token Ring network, Ethernet-based network, the Internet, intranets, and the like. In the preferred embodiment, the computer network 102 is representative of a local area network, such as a secure corporate computer network. More preferably, the computer network 102 includes administratively-enabled security protocols, such as unique username-password combinations, biometric passwords, and the like.

To manage the various electronic devices in data communication with the computer network 102, as will be discussed more fully below, the system 100 employs a directory server 104. As will be understood by those skilled in the art, the directory server 104 is any suitable computing device known in the art capable of providing a structured repository of information regarding all software, hardware, corresponding rights and policies, implemented on the network 102. The skilled artisan will further appreciate that the directory server 104 is representative of a hardware device, software application, or any combination thereof suitably adapted to perform directory services. Preferably, the directory server 104 is capable of interacting with the computer network 102 via a suitable communications link 112. It will be understood by those skilled in the art that the communications link 112 is any suitable channel of data communications known in the art including, but not limited to wireless communications, for example and without limitation, Bluetooth, WiMax, 802.11a, 802.11b, 802.11g, 802.11(x), infrared, optical, or any suitable wireless data transmission system, or wired communications known in the art.

The system 100 further includes an administrative access device, illustrated in FIG. 1 as a desktop computer 106. Although illustrated in FIG. 1 as a desktop computer, the administrative device 106 is suitably capable of being any personal electronic device known in the art capable of data communication and execution of computer programs, such as for example and without limitation, a laptop computer, a workstation, and the like. The administrative device 106 is shown in FIG. 1 as being separated from the directory server 104, however those of appreciable skill in the art will recognize that the administrative device 106 is capable of being integrated with the directory server 104 such that the two components of the system 100 share the same physical hardware. In the preferred embodiment, the administrative device 106 is a separate unit, configured to respond to commands issued by an associated user, such as a network administrator. More preferably, the administrative device 106 suitably includes a processor, memory, storage, user-interface, and the like, which enable the associated administrator to access the administrative device 106, and through the device 106, the computer network 102. As shown in FIG. 1, the administrative device 106 communicates with the computer network 102 via a communications link 114. As will be appreciated by the skilled artisan, the communications link 114 is any suitable means of data communication known in the art including, for example and without limitation, wired data communications channels, Bluetooth, WiMax, 802.11a, 802.11b, 802.11g, 802.11(x), infrared, optical, or any suitable wireless data transmission system. In the preferred embodiment, the administrative device 106 includes an administrative utility application suitably adapted to interface with and manage the directory services provided by the directory server 104.

In addition to the foregoing, the system 100 further includes one or more network peripheral devices, illustrated in FIG. 1 as a document processing device 108 and a document processing device 110. Other peripheral devices, including, without limitation, user devices such as personal data assistants, desktop computers, printers, facsimile machines, scanners, copiers, laptop computers, and other non-administrative configured devices, are also considered peripheral devices in accordance with the present invention. It will be appreciated by those skilled in the art the document processing devices 108 and 110 are advantageously represented in FIG. 1 as multifunction peripheral devices, suitably adapted to provide a variety of document processing services, such as, for example and without limitation, scanning, copying, facsimile, printing, and the like. Suitable commercially available image generating devices include, but are not limited to, the Toshiba e-Studio Series Controller. In one embodiment, the document processing devices 108 and 110 are suitably equipped to receive a plurality of portable storage media, including without limitation, Firewire, USB, SD, MMC, XD, Compact Flash, Memory Stick, and the like. As shown in FIG. 1, the document processing devices 108 and 110 advantageously communicate with the computer network 102 via communications links 116 and 118, respectively. The communications links 116 and 118 are any suitable channel of data communications known in the art including, but not limited to wireless communications, for example and without limitation, Bluetooth, WiMax, 802.11a, 802.11b, 802.11g, 802.11(x), infrared, optical, or any suitable wireless data transmission system, or wired communications known in the art.

In operation, the subject invention uses the administrative device 106 to access the directory server 104 in accordance with the methods discussed in greater detail below. An associated user of the administrative device 106 is first verified by the directory server 104 as being allowed to effect changes to schema of the directory service. Preferably such verification requires the input of a username/password to authenticate the administrator. Once authenticated, the administrator suitably initiates the administrative utility application to assist in the entry of database schema entries. The administrative utility application facilitates the addition, alteration, and management of schema with respect to the directory services of the directory server 104. Prior to effectuating any changes to the schema, the authenticated user is notified, via any suitable means, that the changes will be permanent. Following such notification, the directory server 104 settings are retrieved and returned to the administrative device 106.

It will be understood by those skilled in the art that the utility is advantageously employed in conjunction with a data entry application native to the directory service, filling in fields and forms of the native data entry application automatically with predetermined information so as to avoid errors by the administrator. To insure that the directory server 104 is capable of effectuating the changes desired by the administrator, the administrative utility application first queries the directory server 104 for the presence of predetermined software components required to modify, create, and/or manage the directory service. When the required components are not present, the utility notifies the user to that effect and ceases running. When the required components are present, the utility application prompts the associated user to select the type of operation desired, including, without limitation, creating schema, modifying schema, managing schema, and the like.

When management or modification operations are selected, the administrative utility program selectively retrieves user designated schema, and enables these retrieved schema to be selectively modified. Once the desired schema has been retrieved, or alternatively the desired operation selected, the administrative utility prompts the authenticated user to input schema changes, such as attributes, classes, values, and the like. Once entered, the utility tests the desired changes to determine whether any errors are present in the new or modified schema. It will be appreciated by those skilled in the art that suitable testing includes, without limitation, syntax, spelling, and comparison of new data against predetermined formats, fields, values, and the like. Preferably, the utility automatically enters a predetermined portion of the modified or new schema changes so as to avoid the administrator keying in the information. More preferably, the new or modified schema is representative of control and management of document processing services offered by the document processing device 108, the document processing device 110, a user of the peripherals of the computer network 102, or any combination thereof.

The new or modified schema changes are then verified to ascertain whether the schema changes contain any errors. When errors occur, such as typographical errors, incomplete fields, forms, and the like, the user is notified of the error and the utility prompts the user to correct the error. Once corrected, or if no errors were present in the new or modified schema, the user is prompted to confirm the schema changes. In one particular embodiment, prior to prompting the user for confirmation, the complete schema setup is displayed to the user for review. When the user determines that all or a portion of the new data integrated into the complete schema setup is unacceptable, the user does not confirm the changes and the directory service is not modified. Following user confirmation of the changes made to the schema, the directory service is updated with the new information and the user input schema data is stored on the directory server 104. Thus, the utility, in accordance with the present invention, automates the directory service schema and attribute changes relating to document processing device authentication and user access to document processing services.

Figure 2:
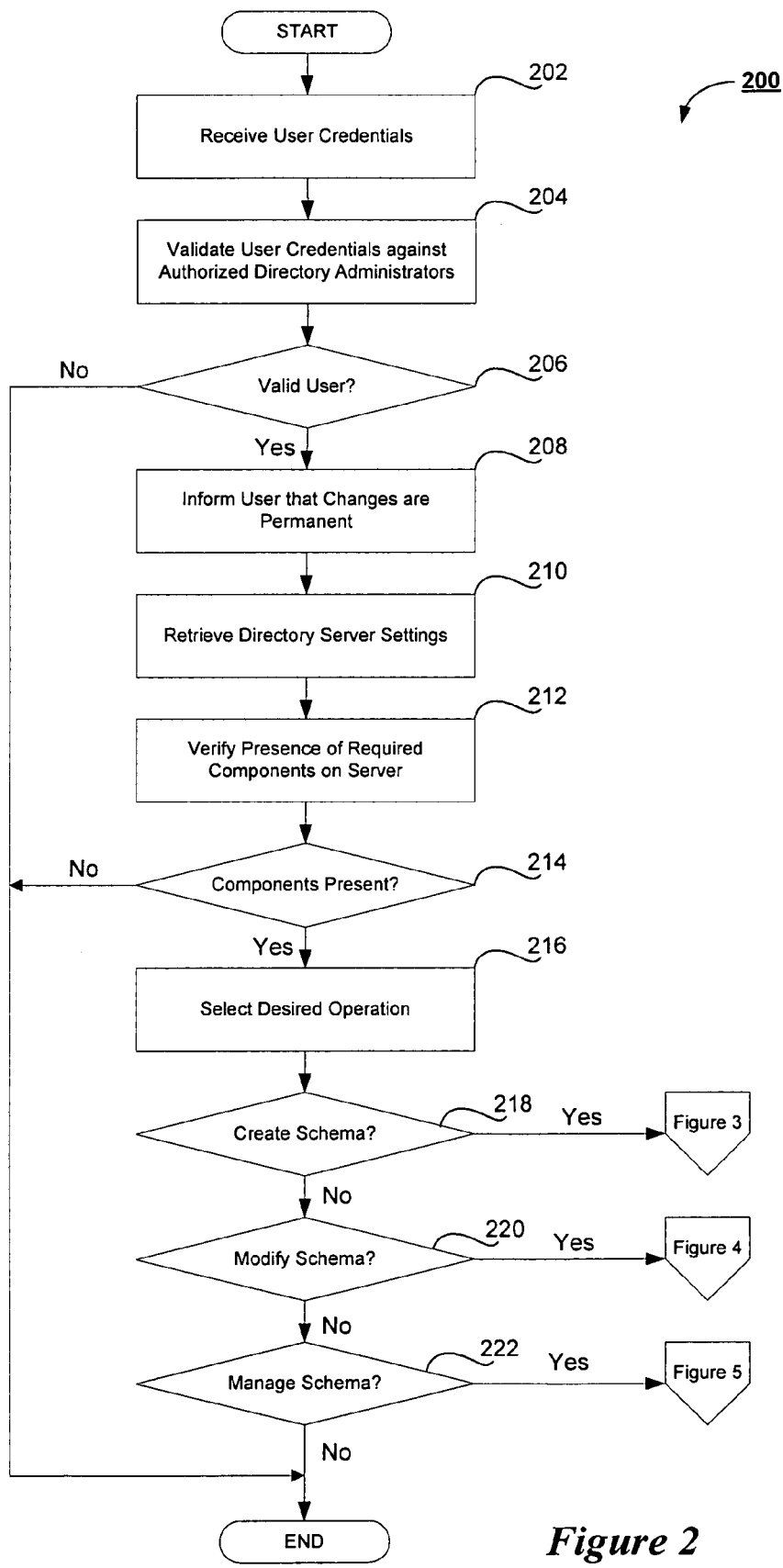
FIG. 2 is a flowchart illustrating a method for assisted entry of database schema entries in accordance with the present invention.

Turning now to FIG. 2, there is shown a flowchart 200 illustrating a method for assisted entry of database schema entries in accordance with the present invention. As illustrated in FIG. 2, the flowchart 200 begins at step 202, wherein user credentials are received by the directory server 104 from a user associated with the administrative device requesting access to the directory services of the directory server 104. It will be understood by those skilled in the art that the directory server 104 advantageously receives the authentication information constituting the user credentials from the administrative device 106. The skilled artisan will further appreciate that suitable authentication information includes, but is not limited to, user identification/user name, password, biometric validation, trusted certificates, and the like. The directory server 104 then validates the user credentials against a listing of authorized directory administrators at step 204. Those skilled in the art will appreciate that any suitable means of verification, known in the art, are capable of being employed by the present invention to validate the administrator attempting to gain access to the directory services of the directory server 104.

A determination is then made at step 206 whether the received user credentials are valid, i.e., whether the requesting user is an authorized directory administrator. In accordance with the preferred embodiment of the present invention, access to the directory server 104 is suitably restricted, via any means known in the art, to those pre-authorized users designated as directory administrators. When the requesting user is not authorized to access the directory server at step 206, the operation terminates and the requesting user is denied access. When a positive determination is made at step 206, flow proceeds to step 208, wherein the requesting user, now recognized as an authorized administrator, is notified that any changes made to the directory services are permanent. Following this notification, flow proceeds to step 210, wherein the directory server 104 settings are retrieved. The settings are then suitably displayed on the administrative device 106, via either the native directory access application, or preferably via the administrative utility application. In either event, the administrative utility program then verifies the presence of required components on the server 104. It will be understood by those skilled in the art that the aforementioned components suitably include software, hardware, and any combination thereof, suitably adapted to perform various directory service functions and implement the subsequent changes, modifications, and/or additions initiated by the administrator. It will further be understood by the skilled artisan that the various directory service functions include those functions which the administrative utility application uses.

A determination is then made at step 214 whether the components are present on the directory server 104. When the directory server 104 lacks the required components, the user is notified via any suitable means that schema changes are not allowed and the operation terminates. When the required components are available on the directory server 104, flow proceeds to step 216, wherein the user is prompted to select a schema-related operation in accordance with the present invention. The administrative utility application, according to the preferred embodiment of the subject invention, allows the administrator to create new schema data, modify existing schema data, and manage existing schema data. Returning to the flowchart 200 of FIG. 2, following selection of the desired operation, flow proceeds to step 218, wherein a determination is made whether the user has selected the create new schema data. When the selected operation is the addition of new data, processing continues to the flowchart 300 illustrated in FIG. 3. When the user has not selected to create new schema data, flow proceeds to step 220, wherein a determination is made whether the user has selected the modify existing schema data. When the user has selected the modify operation, flow proceeds to the flowchart 400 of FIG. 4. In the event that the user has not selected the modify operation, flow proceeds to step 222, wherein a determination is made whether the user has selected the management operation in accordance with the present invention. When the management operation has been selected, flow proceeds to the flowchart 500 of FIG. 5.

When the user has not selected the management operation, for instance when the user elects to cancel operations, the process terminates. The functions of the aforementioned operations are discussed more fully below with respect to descriptions associated with each of FIG. 3, FIG. 4, and FIG. 5.

Figure 3:
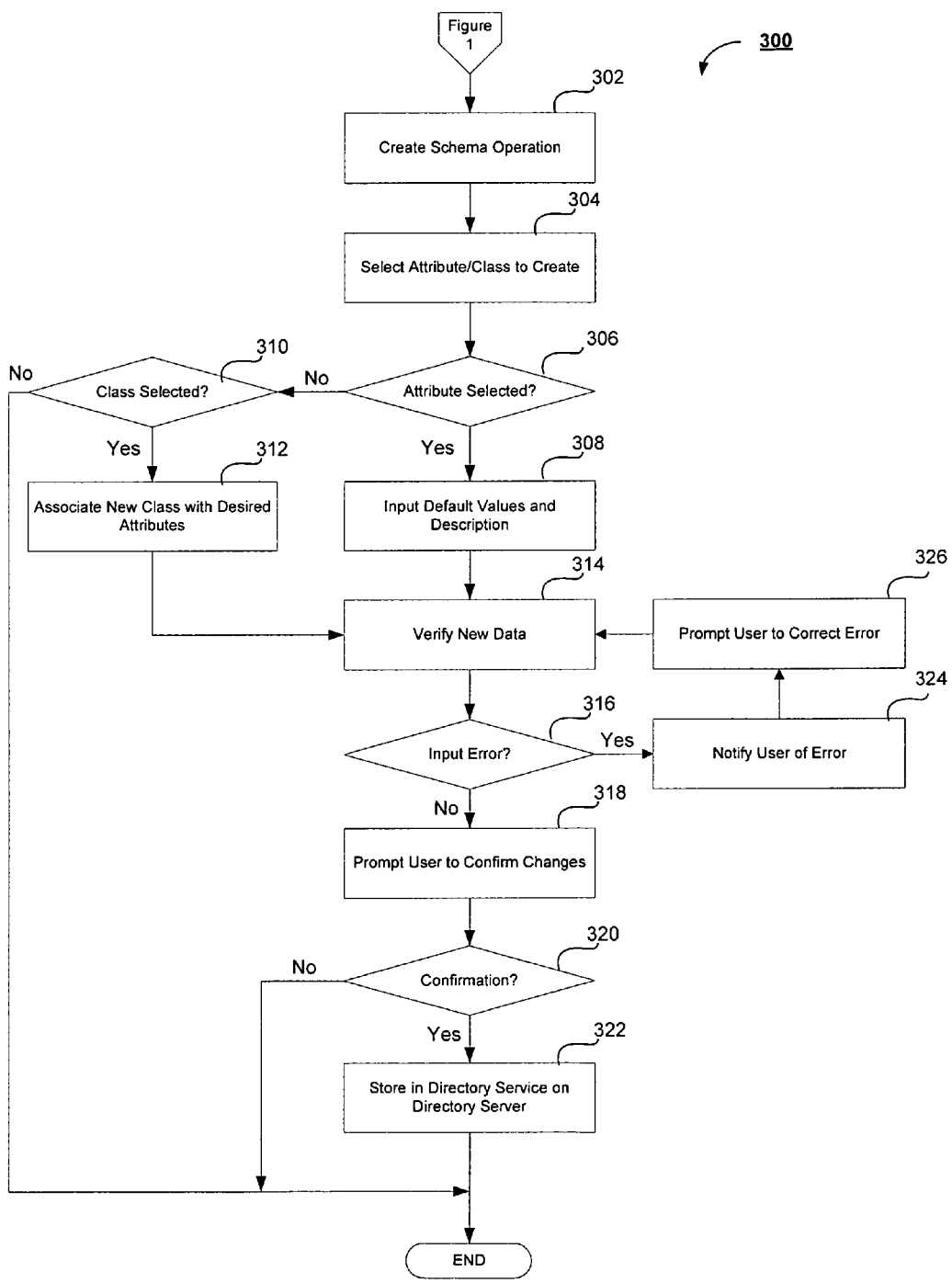
FIG. 3 is a flowchart illustrating a generation of new schema data operation in accordance with the present invention.

Turning now to FIG. 3, there is shown a flowchart 300 illustrating the generation of new schema data operation in accordance with the present invention. Beginning at step 302, the user has selected to the new schema data generation operation. Flow then proceeds to step 304, wherein the user selects the attribute or class to create. A determination is then made at step 306 whether the user has selected to create an attribute. When the user desires to generate a new attribute, such as, for example and with respect to the document processing device 108, document processing control attributes, flow proceeds to step 308, wherein the user inputs the default values and description corresponding to the new attribute. It will be understood by those skilled in the art that the use of the document processing device 108 herein is for example purposes only, and attributes to be associated with other devices on the computer network 102 are equally capable of being generated using the subject invention.

Returning to step 306, when a determination is made that the user has not selected to create a new attribute, flow proceeds to step 310, wherein a determination is made whether the user has selected to create new class schema. When the user has selected to neither create new class schema or to create a new attribute, such as for example, when the user selects to cancel the operation, the process terminates. When the user selects the new class schema creation operation at step 310, flow proceeds to step 312, wherein the new class is associated with desired attributes. Preferably, the administrative utility facilitates the selection of the associated attributes so as to prevent errors during the creation of the new class schema. Flow then proceeds to step 314, wherein the new class data is verified. In addition, following input of the default values and corresponding description at step 308, flow proceeds to step 314 to verify the new attribute data.

At step 316, the administrative utility application then determines whether an input error has occurred during the user entry of the new class schema or the new attribute data. In addition to verifying that no syntax, typographical, or other errors are present, the application checks the input data against predetermined values input by an administrator, so as to avoid common errors and invalid entries. When it is determined that an input error has occurred, flow proceeds to step 324, wherein the user is notified via any suitable means that an error has occurred, the nature of the error, and other relevant information, as will be appreciated by those skilled in the art. The user is then prompted at step 326 to correct the error prior to continuing the creation process. The corrected data is then verified at step 314 and subjected to the input error determination of step 316.

When no input errors are detected, flow proceeds to step 318, where the user is prompted to confirm the changes made during the creation process, i.e., to confirm that the new class schema or the new attribute schema is to be entered into the directory service and stored on the directory server 104. In the preferred embodiment, the confirmation prompt suitably includes a representation of the complete schema setup associated with the directory service of the directory server 104, thereby enabling the user to view the overall affect of the proposed changes to the schema data. When the user confirms the changes at step 320, flow proceeds to step 322, when the new schema data is stored on the directory server 104 and the process terminates. When the user does not confirm the changes at step 320, the operation terminates and the new class schema data or the new attribute schema data is discarded.

Figure 4:
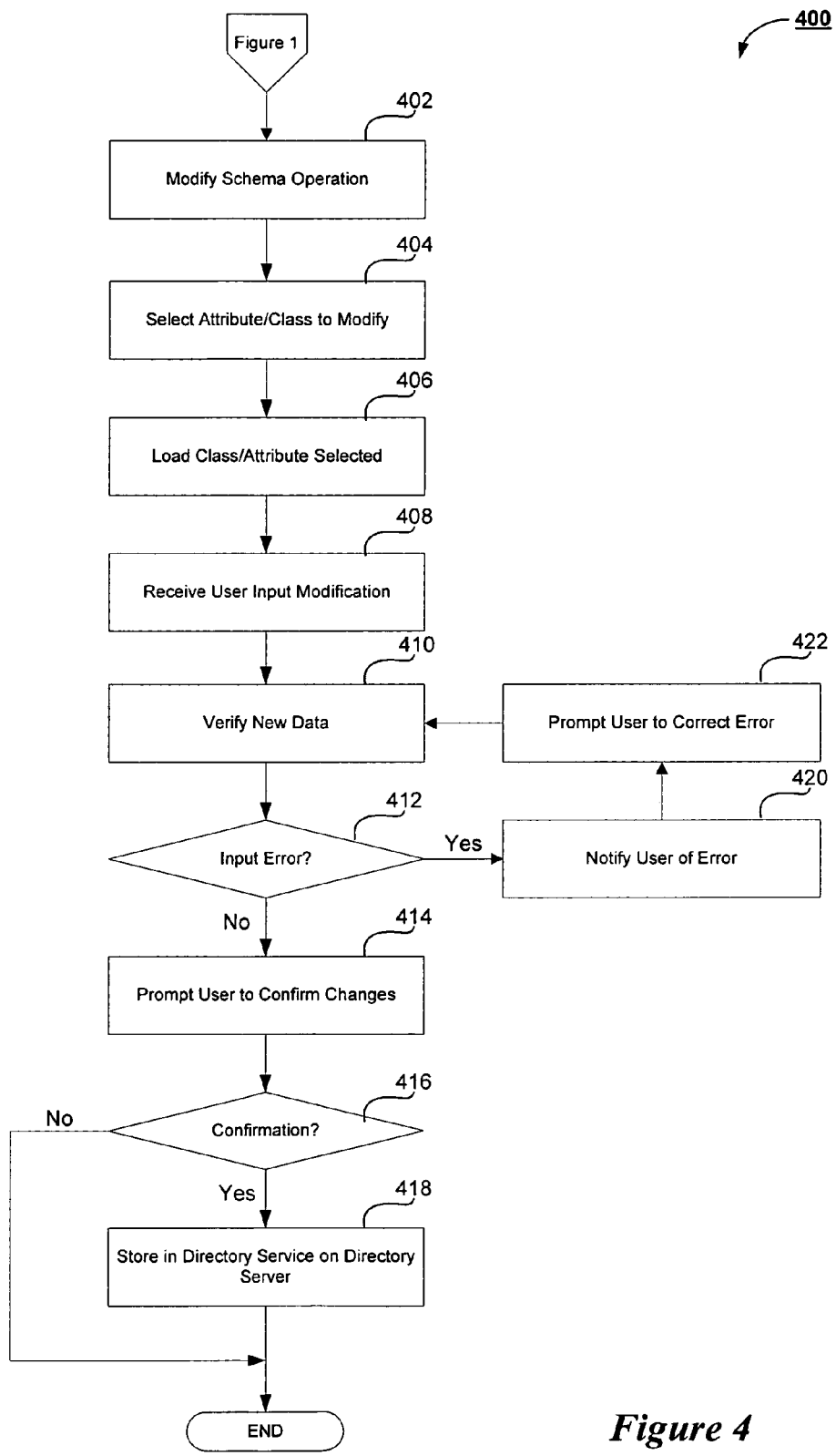
FIG. 4 is a flowchart illustrating a modification of schema data in accordance with the present invention.

Turning now to FIG. 4, there is shown a flowchart 400 illustrating the modification of schema data in accordance with the present invention. Once the user has selected the modification operation at step 402, the user is prompted, via any suitable means, to select the attribute or class to modify at step 404. The selected attribute or class is then loaded by the administrative utility at step 406. At step 408, the administrative utility receives user input modification data corresponding to the selected attribute or class, which is then verified by at step 410. The verification process includes step 412, wherein a determination is made whether an input error has occurred during the user entry of the modified class schema data or the modified attribute schema data. The administrative utility application tests for syntax errors, typographical errors, and other common errors using predetermined values input by an administrator, which prevents the entry into the directory service of erroneous or invalid entries.

When it is determined by the administrative utility application that an error has occurred, flow proceeds to step 420, wherein the user is notified of occurrence and nature of the error via any means known in the art. The user is then prompted at step 422 to correct the error. Once the user has corrected the error, flow returns to step 410, wherein the corrected data is verified and then tested at step 412 for the presence of any new input errors.

When the testing step of 412 determines that no input errors are present, flow proceeds to step 414, where the user is prompted to confirm the changes made during the modification process, i.e., to confirm that the modified class or attribute schema data is to be entered into the directory service and stored on the directory server 104. In the preferred embodiment, the confirmation prompt suitably includes a representation of the complete schema setup associated with the directory service of the directory server 104, thereby enabling the user to view the overall affect of the proposed changes to the schema data. Once the user has confirmed the changes at step 416, flow proceeds to step 418, wherein the modified schema data is stored on the directory server 104 and the process terminates. When the user does not confirm the changes at step 416, the operation terminates and the modified class schema data or the modified attribute schema data is discarded.

Figure 5:
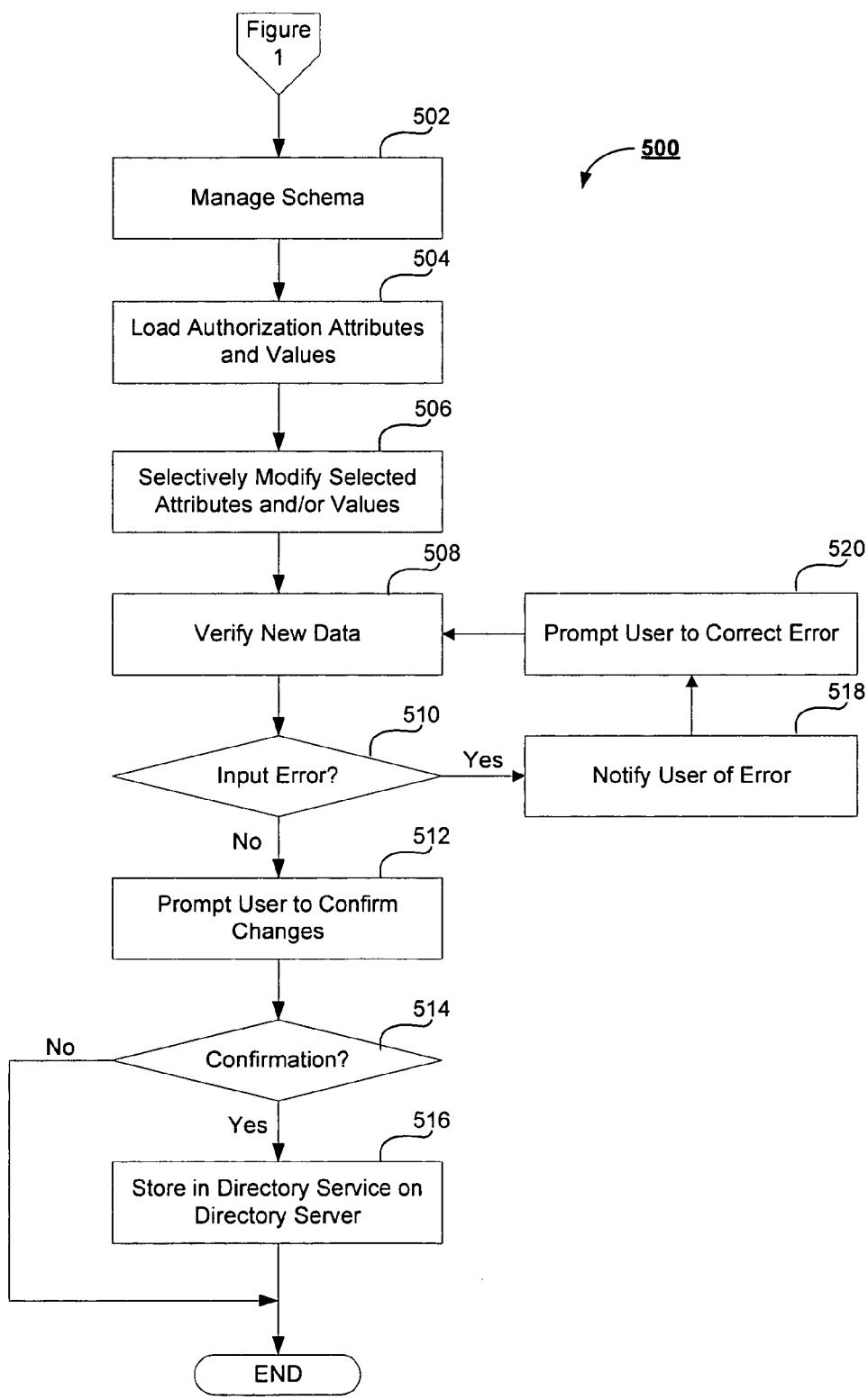
FIG. 5 is a flowchart illustrating a management operation in accordance with the present invention.

Referring now to FIG. 5, there is shown a flowchart 500 illustrating the management operation in accordance with the present invention. As shown in FIG. 5, the user has selected the manage schema operation, represented at step 502, whereupon flow proceeds to step 504. At step 504, the authorization attributes and values are loaded by the administrative utility application via any suitable means known in the art. In the preferred embodiment, the administrative utility retrieves the authorization attributes and values from the directory service residing on the directory server 104. At step 506, the user selectively modifies those attributes or values requiring change. In accordance with one aspect of the present invention, the administrative utility suitably includes predetermined fields containing user selectable values, which values are capable of being selected by the user so as to avoid manually keying in such information and limiting the possibility of a typographical or invalid entry. Flow then proceeds to step 508, wherein the modified attributes and/or values are subjected to verification by the administrative utility. Preferably, the modified attributes and/or values verified against predetermined values corresponding thereto, in addition to testing the modifications for common errors in syntax, spelling, and the like.

When it is determined at step 510 that one or more input errors have been detected by the administrative utility, flow proceeds to step 518, wherein the user is notified of the occurrence and the content of the error. The user is then prompted to correct the detected error at step 520. The corrected data is then verified at step 508 and tested for input errors at step 510. When no errors are detected at step 510, flow proceeds to step 512, where the user is prompted to confirm the modifications made to the selected attributes and/or values. In the preferred embodiment, the confirmation prompt suitably includes a representation of the complete schema setup associated with the directory service of the directory server 104, thereby enabling the user to view the overall affect of the proposed modifications on the schema. Once the user has confirmed the changes at step 514, flow proceeds to step 516, wherein the modified attributes and/or values are stored on the directory server 104 and the process terminates. When the user does not confirm the changes at step 514, the operation terminates and the modified attribute schema data and/or modified value are discarded.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A system for assisted entry of database schema entries comprising:

a digital computer including a processor and memory;

means adapted for receiving user credentials from an associated user;

testing means adapted for testing received user credentials to determine schema editing rights of the associated user;

means adapted for selectively receiving, from an associated user, schema input data in accordance with an output of the testing means;

validation means adapted for testing schema input data to determine acceptability thereof;

means adapted for prompting the associated user for corrected schema input data upon a determination of unacceptability thereof via the testing means;

testing means adapted for testing for a presence of software tools required to implement schema instructions specified by the schema input data;

means adapted for generating a signal representative of an absence of requisite software tools as determined by the testing means;

means adapted for generating a representation of a complete schema setup inclusive of the schema input data;

means adapted for prompting the associated user for confirmation as to acceptability of the complete schema setup;

means adapted for receiving, from the associated user, confirmation data representative of acceptability of the complete schema setup, wherein the associated database server completes a modification to an active directory set relative to at least one multi-function peripheral in accordance with the complete schema setup, and wherein the modification to the active directory setup includes at least one of control and management of document processing functions of the at least one multi-function peripheral;

means adapted for communicating the complete schema setup to an associated database server for implementation upon receipt of the confirmation data; and means adapted for terminating the communication of the complete schema data, inclusive of the schema input data, as a result of the absence of requisite software tools as determined by the presence testing means.

2. The system for assisted entry of database schema entries of claim 1, further comprising a means adapted for amending a preexisting complete schema setup in connection with the schema input data.

3. The system for assisted entry of database schema entries of claim 2 wherein the schema input data includes data representative of at least one of an instruction to create attributes and classes relative to the complete schema and an instruction to modify attributes and classes relative to the complete schema.

4. The system for assisted entry of database schema entries of claim 3, further comprising means adapted for generating a notification representative of a permanence of the implementation of the complete schema setup.

5. A method for assisted entry of database schema entries comprising the steps of:

receiving user credentials from an associated user;

testing, in a processor having memory associated therewith, received user credentials to determine schema editing rights of the associated user;

selectively receiving, from an associated user, schema input data in accordance with an output of the testing;

testing schema input data to determine acceptability thereof;

prompting the associated user for corrected schema input data upon a determination of unacceptability thereof via the schema testing;

testing for a presence of software tools required to implement schema instructions specified by the schema input data;

generating a signal representative of an absence of requisite software tools as determined by the presence testing;

generating a representation of a complete schema setup inclusive of the schema input data;

prompting the associated user for confirmation as to acceptability of the complete schema setup;

receiving, from the associated user, confirmation data representative of acceptability of the complete schema setup, wherein the associated database server completes a modification to an active directory set relative to at least one multi-function peripheral in accordance with the complete schema setup, and wherein the modification to the active directory setup includes at least one of control and management of document processing functions of the at least one multi-function peripheral;

communicating the complete schema setup to an associated database server for implementation upon receipt of the confirmation data; and terminating the communication of the complete schema data, inclusive of the schema input data, as a result of the absence of requisite software tools as determined by the presence testing.

6. The method for assisted entry of database schema entries of claim 5, further comprising the step of amending a preexisting complete schema setup in connection with the schema input data.

7. The method for assisted entry of database schema entries of claim 6, wherein the schema input data includes data representative of at least one of an instruction to create attributes and classes relative to the complete schema and an instruction to modify attributes and classes relative to the complete schema.

8. The method for assisted entry of database schema entries of claim 7, further comprising the step of generating a notification representative of a permanence of the implementation of the complete schema setup.

9. A computer-readable storage medium of instructions with computer-readable instructions stored thereon for assisted entry of database schema entries comprising:

instructions for receiving user credentials from an associated user;

instructions for testing received user credentials to determine schema editing rights of the associated user in a processor having a memory associated therewith;

instructions for selectively receiving, from an associated user, schema input data in accordance with an output of the testing;

instructions for testing schema input data to determine acceptability thereof;

instructions for prompting the associated user for corrected schema input data upon a determination of unacceptability thereof via the schema testing;

instructions for testing for a presence of software tools required to implement schema instructions specified by the schema input data;

instructions for generating a signal representative of an absence of requisite software tools as determined by the presence testing;

instructions for generating of a representation of a complete schema setup inclusive of the schema input data;

instructions for prompting the associated user for confirmation as to acceptability of the complete schema setup;

instructions for receiving, from the associated user, confirmation data representative of acceptability of the complete schema setup, wherein the associated database server completes a modification to an active directory set relative to at least one multi-function peripheral in accordance with the complete schema setup, and wherein the modification to the active directory setup includes at least one of control and management of document processing functions of the at least one multi-function peripheral;

instructions for communicating the complete schema setup to an associated database server for implementation upon receipt of the confirmation data; and instructions for terminating the communication of the complete schema data, inclusive of the schema input data, as a result of the absence of requisite software tools as determined by the presence testing.

10. The computer-readable medium of instructions with computer-readable instructions stored thereon for assisted entry of database schema entries of claim 9, further comprising instructions for amending a preexisting complete schema setup in connection with the schema input data.

11. The computer-readable medium of instructions with computer-readable instructions stored thereon for assisted entry of database schema entries of claim 10, wherein the schema input data includes data representative of at least one of an instruction to create attributes and classes relative to the complete schema and an instruction to modify attributes and classes relative to the complete schema.

12. The computer-readable medium of instructions with computer-readable instructions stored thereon for assisted entry of database schema entries of claim 11, further comprising instructions for generating a notification representative of a permanence of the implementation of the complete schema setup.

* * * * *